US012397824B2

(12) United States Patent
Goradia et al.

(10) Patent No.: US 12,397,824 B2
(45) Date of Patent: Aug. 26, 2025

(54) MODIFICATION OF THE PLANNED PATH OF AN AUTONOMOUS VEHICLE TO CONVERGE TO THE ACTUAL POSITION

(71) Applicant: GM Cruise Holdings LLC, San Francisco, CA (US)

(72) Inventors: Rushil Goradia, San Francisco, CA (US); Dogan Gidon, Seattle, WA (US); Martin Sehr, Kensington, CA (US); Pradeep Bhatta, Princeton, NJ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 232 days.

(21) Appl. No.: 17/950,881

(22) Filed: Sep. 22, 2022

(65) Prior Publication Data
US 2024/0109558 A1    Apr. 4, 2024

(51) Int. Cl.
*B60W 60/00*    (2020.01)
*B60W 30/02*    (2012.01)

(52) U.S. Cl.
CPC ........ *B60W 60/0015* (2020.02); *B60W 30/02* (2013.01); *B60W 2710/18* (2013.01); *B60W 2720/24* (2013.01)

(58) Field of Classification Search
CPC ............ B60W 60/0015; B60W 30/02; B60W 2710/18; B60W 2720/24
See application file for complete search history.

(56) References Cited

U.S. PATENT DOCUMENTS

2019/0138000 A1*  5/2019  Hammond ........ B60W 50/0205
2022/0041146 A1*  2/2022  Tschanz ............ B60W 60/0015

* cited by examiner

*Primary Examiner* — Andrew J Cromer
(74) *Attorney, Agent, or Firm* — CANTOR COLBURN LLP

(57) ABSTRACT

Systems and techniques are provided for adjusting the planned path of an autonomous vehicle to converge with the actual path. An example method can include determining a first pose error associated with a first pose component from one or more pose components, wherein the first pose error is based on a first difference between an actual pose of an autonomous vehicle and a planned pose of the autonomous vehicle; determining that the first pose error associated with the first pose component exceeds a pose error threshold corresponding to the first pose component; and generating a new planned pose of the autonomous vehicle that yields a reduced first pose error associated with the first pose component, wherein the reduced first pose error is based on a second difference between the actual pose of the autonomous vehicle and the new planned pose of the autonomous vehicle.

20 Claims, 10 Drawing Sheets

MODIFICATION OF THE PLANNED PATH OF AN AUTONOMOUS VEHICLE TO CONVERGE TO THE ACTUAL POSITION

BACKGROUND

1. Technical Field

The present disclosure generally relates to operation of autonomous vehicles. For example, aspects of the present disclosure relate to techniques and systems for detecting a divergence with respect to the planned path of an autonomous vehicle and modifying the planned path to converge with the actual position of the autonomous vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
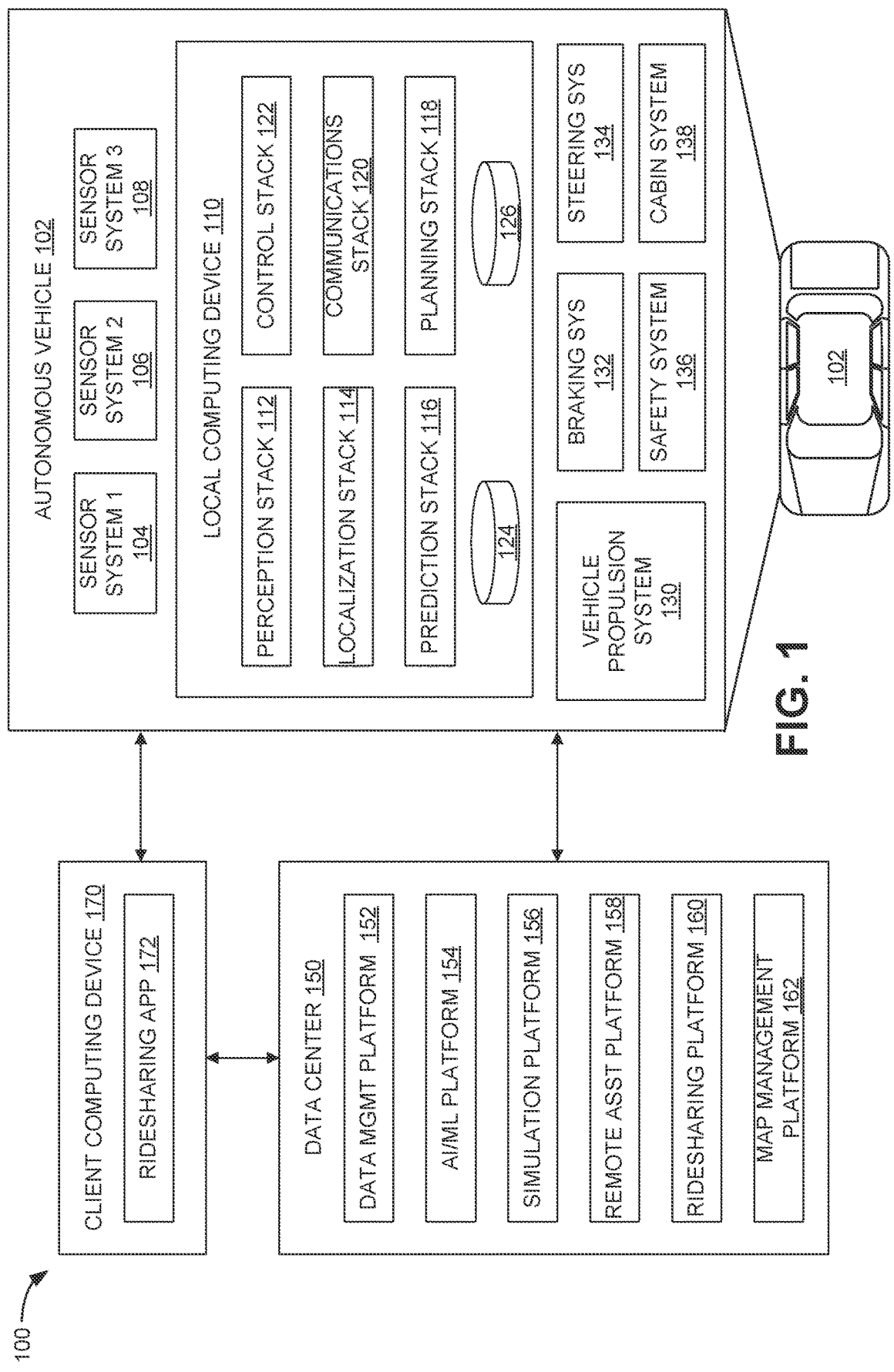
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the AV, which can use the data and measurements to control mechanical systems of the AV, such as a vehicle propulsion system, a braking system, and/or a steering system, etc.

In some cases, an AV may include a planning module (e.g., a planning stack) that can be configured to plan and/or predict the path of the AV (e.g., using data and measurements from AV sensors). In some examples, an AV may include a controller module (e.g., a control stack) that controls or operates the mechanical systems of the AV in a manner that causes the AV to follow the planned path generated by the planning module. In some instances, one or more factors may prevent the controller from causing the AV to follow the planned path which can result in a divergence between the planned path and the actual path of the AV. In some aspects, factors that may cause a divergence between the planned path and the actual path of the AV may include changes in vehicle dynamics (e.g., anti-lock braking system (ABS) event, traction control system (TCS) event, electronic and stability control (ESC) event, etc.), unmodeled or uncompensated road geometries (e.g., high road grade, road bank, road crests, road sags, etc.), road conditions (e.g., potholes, wet roads, sandy roads, etc.), actuator degradation, tire misalignment, any other factor, and/or any combination thereof.

In some aspects, the divergence between the planned path and the actual path of an AV may present a risk of a safety critical event (e.g., an event encountered by the AV that has an impact on the safety of the AV and/or rider) such as a vehicle collision. In some cases, the risk of a safety critical event may be based on the magnitude of the error between the planned path and the actual path of the AV. For example, a large divergence between the planned path and the actual path may increase the risk of a safety critical event necessitating immediate remediation while a small divergence between the planned path and the actual path may be tolerable for some amount of time. In some instances, the divergence and the associated risk may increase further unless the planned path is modified. For example, the planning module may generate a planned path for the AV that is based on an assumed position that is incorrect, which may further increase the error between the assumed position and the actual position.

Described herein are systems, apparatuses, processes (also referred to as methods), and computer-readable media (collectively referred to as "systems and techniques") for detecting and correcting a divergence between a planned path of an AV and an actual path of an AV. In some cases, a divergence between the planned path and the actual path of an AV can be determined by measuring the difference between the actual AV pose and the planned AV pose at one or more time instances. In some aspects, the planned AV pose can correspond to the expected position and the expected orientation of the AV at a particular time instance (e.g., based on a planned AV path). In some cases, the actual AV pose can correspond to the actual position and the actual orientation of the AV at any given time instance. In some aspects, a discrepancy between the planned AV pose and the actual AV pose may be caused by traction control issues, wheel misalignment, braking issues, etc. In some examples, the AV may determine differences between a planned pose and an actual pose with respect to one or more pose components (e.g., a forward pose component, a rear pose component, a left pose component, and/or a right pose component). In some cases, a difference between a planned AV pose and an actual AV pose (e.g., based on one or more pose components) may be used to determine a discrepancy or divergence with respect to the planned path of the AV. In some examples, a difference between a planned AV pose and an actual AV pose (e.g., based on one or more pose components) may be used to trigger a correction in the planned path.

In some aspects, each of the pose components can be associated with a pose error threshold. In some examples, a difference in a pose component that is less than the corresponding pose error threshold may be tolerated for a first amount of time. In some cases, a difference in a pose component that exceeds the corresponding pose error threshold may be used to trigger a correction or modification to the planned path of the AV (e.g., immediately or within a second amount of time). For example, a new planned path may be determined when the difference in at least one pose component (e.g., a left pose component, a right pose component, a forward pose component, and/or a rear pose component) exceeds a pose error threshold. In some instances, modification of the planned path can include generating a new planned pose that is in closer proximity to the actual pose of the AV. For example, the planned pose may be modified to reduce an error associated with one or more pose components such that the new planned pose fully or partially converges with the actual pose of the AV. In some aspects, reducing the error between the planned AV pose and the actual AV pose can improve the operation of the AV. For example, reducing the error between the planned AV pose and the actual AV pose can improve rider comfort (e.g., reduce risk of a sudden stop), improve maneuverability (e.g., smoother ride and turns), mitigate hardware issues (e.g., compensate for misalignment or tire traction issues), reduce safety risk (e.g., avoid a "close call" or a collision), etc.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some cases, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
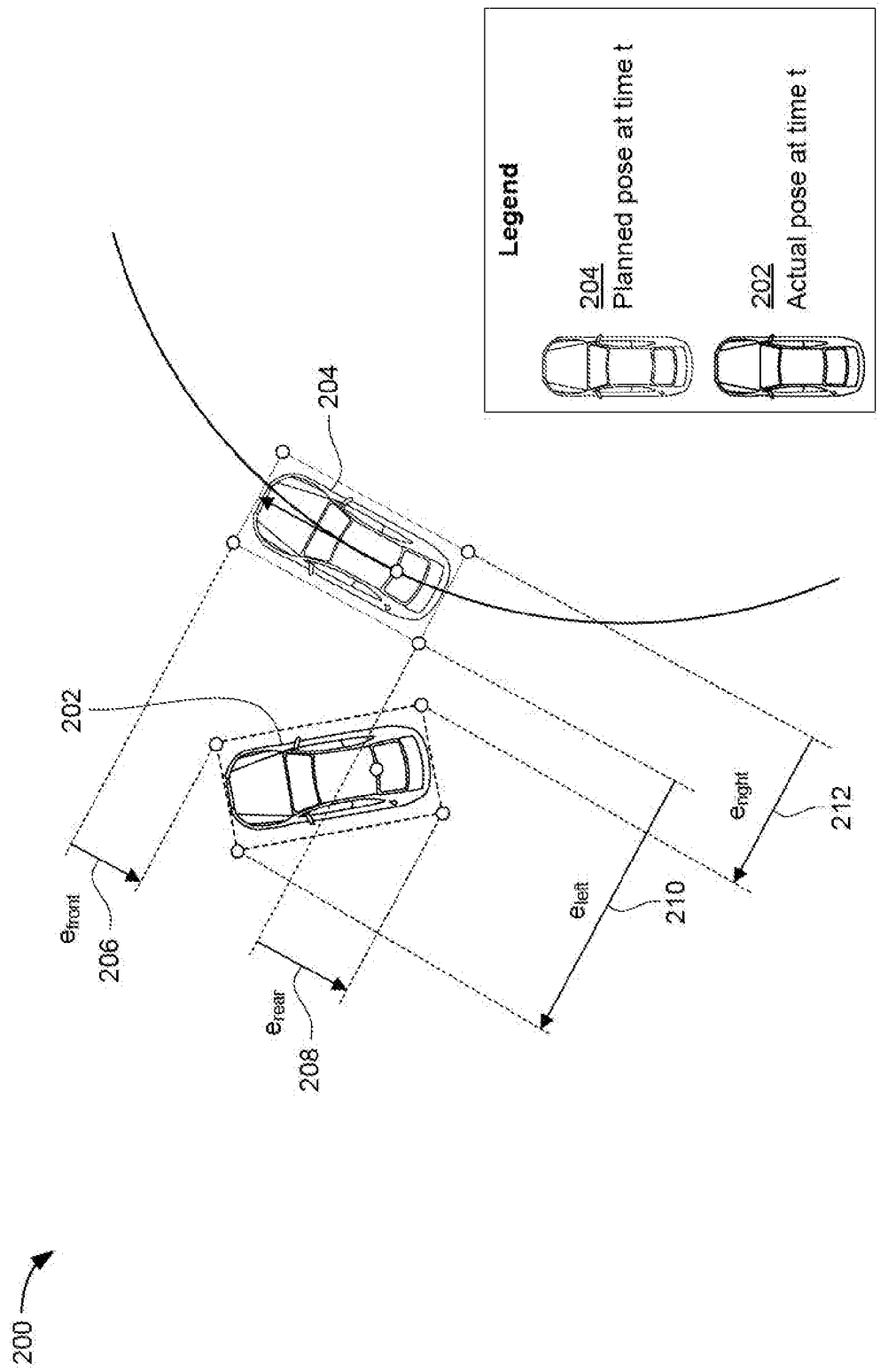
FIG. 2 is a diagram illustrating an example system for detecting a divergence with respect to the planned pose of an autonomous vehicle.

As noted above, systems and techniques are provided herein for detecting and correcting a divergence between a planned path of an autonomous vehicle (AV) and an actual path of an AV. FIG. 2 is a diagram illustrating an example system 200 for detecting a divergence with respect to the planned pose of an AV. In some aspects, system 200 illustrates differences in one or more pose components for an AV (e.g., AV 102) at a time t.

In some cases, system 200 can include actual pose 202 and planned pose 204. In some aspects, actual pose 202 corresponds to the actual position and the actual orientation of the AV at time t. In some examples, planned pose 204 corresponds to the planned position and the planned orientation of the AV at time t. In some aspects, an AV (e.g., AV 102) can calculate a divergence between actual pose 202 and planned pose 204. In some examples, the divergence between actual pose 202 and planned pose 204 can be determined based on the difference between one or more pose components. For example, the divergence between actual pose 202 and planned pose 204 can include a difference or error in a front pose component that may be denoted as front pose error 206 (e.g., e front). In another example, the divergence between actual pose 202 and planned pose 204 can include a difference or error in a rear pose component that may be denoted as rear pose error 208 (e.g., $e_{rear}$). In another example, the divergence between actual pose 202 and planned pose 204 can include a difference or error in a left pose component that may be denoted as left pose error 210 (e.g., $e_{left}$). In another example, the divergence between actual pose 202 and planned pose 204 can include a difference or error in a right pose component that may be denoted as right pose error 212 (e.g., $e_{right}$).

In some aspects, each of the pose components errors (e.g., front pose error 206, rear pose error 208, left pose error 210, and/or right pose error 212) can be associated with one or more pose error thresholds. In some cases, planned pose 204 can be modified when a pose component error is greater than or equal to a corresponding pose error threshold. For example, as illustrated further below in connection with FIGS. 5A, 5B, and 5C, planned pose 204 can be shifted in a direction that is closer to actual pose 202 in order to reduce one or more of the pose component errors (e.g., front pose error 206, rear pose error 208, left pose error 210, and/or right pose error 212).

In some examples, the pose error threshold corresponding to each of the pose component errors can include an initial threshold that can be used to identify a long tail event (e.g., a pose error that exceeds a percentage of a statistical distribution of pose errors). In one example, the initial error threshold may correspond to pose errors that are above the $95^{th}$ percentile (i.e., p95) level. In another example, the initial error threshold may correspond to pose errors that are above the $99.999^{th}$ percentile (i.e., p99.999) level. In further examples, the initial error threshold may correspond to pose errors that are above any other percentile level based on one or more statistical parameters associated with pose errors.

In some examples, a long tail event (e.g., pose component error exceeding p99.999 error threshold) may be classified as a pending long tail event or a matured (e.g., actual or existing) long tail event. In some cases, a pending long tail event may occur when a pose component error does not exceed a pose error threshold for more than a first time period (e.g., T1). In some instances, a matured long tail event may occur when a pose component error exceeds a pose error threshold for a time greater than a second time period (e.g., T2). In some aspects, a matured long tail event can be determined based on a collision risk (e.g., collision risk integral), as discussed further below.

Figure 3A:
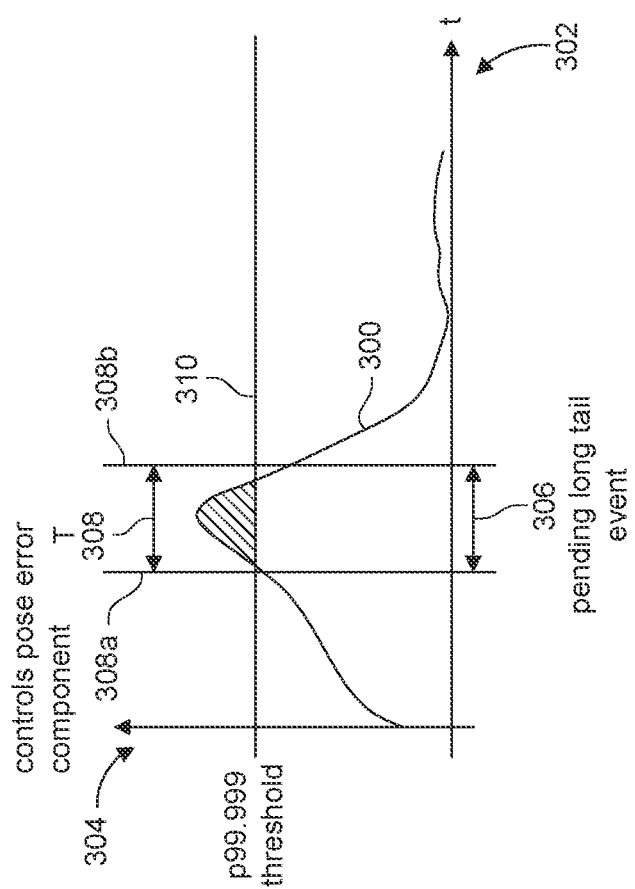
FIG. 3A is a graph illustrating an example of an error condition that may trigger modification of the planned pose of an autonomous vehicle.

FIG. 3A is a graphical representation of pose error component curve 300 in which the x-axis corresponds to time 302 and the y-axis corresponds to pose component error 304 (e.g., front pose error 206, rear pose error 208, left pose error 210, and/or right pose error 212). In some aspects, a pending long tail event 306 may be detected during a time when pose component error 304 exceeds a threshold value (e.g., p99.999 threshold 310). For example, pending long tail event 306 may occur between time 308a and time 308b in which pose component error 304 exceeds p99.999 threshold 310.

In some cases, the time period T 308 (e.g., between time 308a and time 308b) may be used to classify pending long tail event 306. For example, the time period T 308 may correspond to a maximum allowable time in which pose component error 304 may exceed p99.999 threshold 310. In some cases, time period T 308 may correspond to a time required for an AV (e.g., AV 102) to update a reference trajectory computation. In one illustrative example, time period T 308 may be approximately 0.30 seconds (s).

Figure 3B:
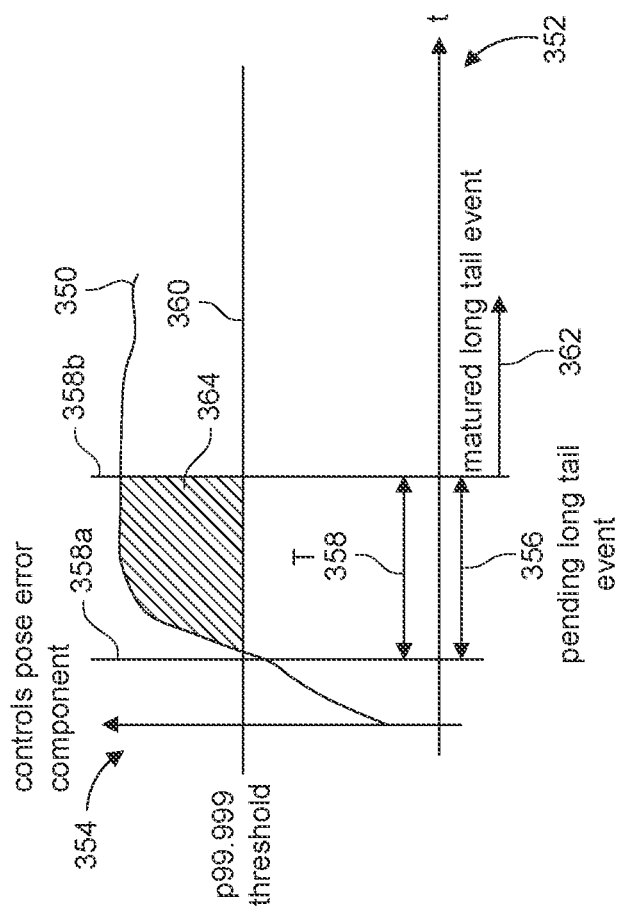
FIG. 3B is a graph illustrating another example of an error condition that may trigger modification of the planned pose of an autonomous vehicle.

FIG. 3B is a graphical representation of pose error component curve 350 in which the x-axis corresponds to time 352 and the y-axis corresponds to pose component error 354 (e.g., front pose error 206, rear pose error 208, left pose error 210, and/or right pose error 212). In some aspects, a pending long tail event 356 may be detected when pose component error 354 exceeds a threshold value (e.g., p99.999 threshold 360). For example, pending long tail event 356 may occur between time 358a and time 358b in which pose component error 354 exceeds p99.999 threshold 360. In some examples, matured long tail event 362 may be detected when pose component error 354 remains above p99.999 threshold for a time greater than time T 358 (e.g., after pending long tail event 356). In some examples, time T 358 may correspond to a minimum amount of time that pose component error 354 exceeds p99.999 threshold 360 prior to matured long tail event 362. In one illustrative example, time T 358 may be approximately 0.15 s.

In some aspects, matured long tail event 362 may be determined or detected based on a collision risk metric. In some cases, the collision risk metric can be calculated based on a collision risk integral corresponding to area 364 (e.g., area under pose error component curve 350 and greater than p99.999 threshold 360 during time T 358). In some examples, the collision risk integral may represent the accumulated risk during a long tail event (e.g., pending long tail event 356).

In some instances, the pose component error $e_i$ that accumulates a probability of collision $p_{allowed}$ (t=FDTI) over a time $t_i$ can be represented according to the following equation (1), in which FDTI corresponds to a fault detection time interval (e.g., time interval from occurrence of fault to detection of fault by AV 102) and where $p_{actual,i}^{-1}$ refers to the inverse of the function $p_{actual,i}(t=t_i,\cdot)$, as follows:

$$e_i = p_{actual,i}^{-1}(p_{allowed}(t=\text{FDTI})) \quad (1)$$

In some aspects, equation (1) may be used to determine how long a constant pose component error may be tolerated before a collision risk increases to a level corresponding to a long tail event. In some cases, the length of time may be a function of the pose component error, g(e).

Figure 4:
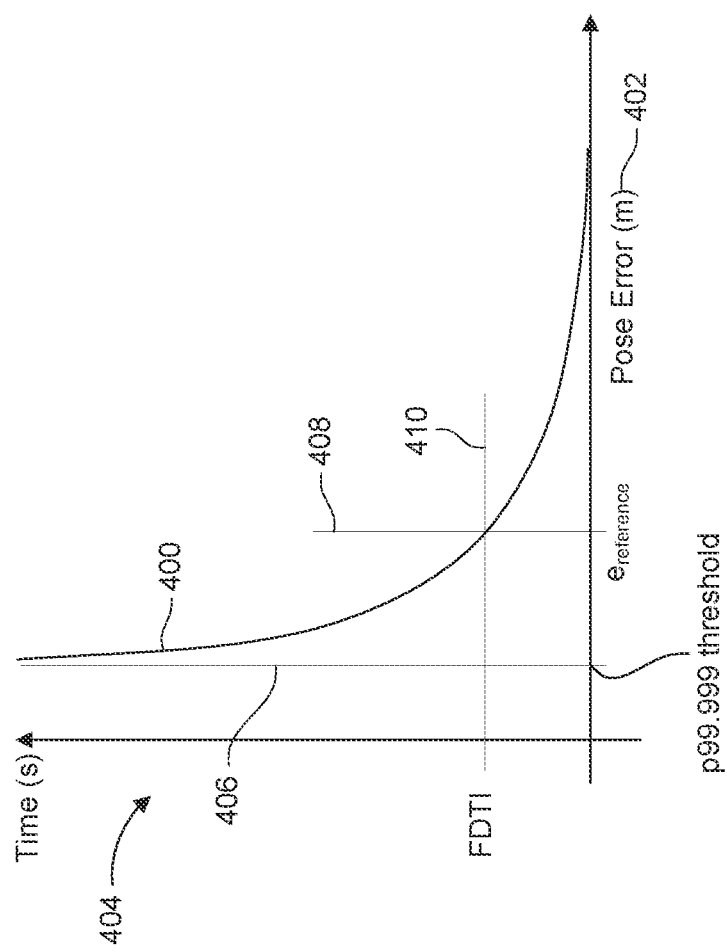
FIG. 4 is a graph illustrating an example relationship between pose error of an autonomous vehicle and time.

FIG. 4 is a graphical representation of pose error component curve 400 in which the x-axis corresponds to pose error component 402 and the y-axis corresponds to time 404. In some aspects, the y-axis may indicate a length of time that an error may be tolerated by an AV. For instance, an error that is approximately equal to p99.999 threshold 406 may be tolerated for a longer time than an error that greater than or equal to $e_{reference}$ 408. In some aspects, $e_{reference}$ 408 may correspond to a pose error 402 that is determined at or about the fault detection time interval (e.g., FDTI 410). As illustrated, as pose error component curve 400 approaches p99.999 threshold 406, the time 404 that an AV may tolerate the pose error 402 increases.

In some examples, the accumulated risk of collision can be represented by a time integral, R, as follows:

$$R = \int_{t_s}^{t} h(e(\tau) - e_{p99.999}) d\tau \quad (2)$$

In some aspects, $t_s$ can correspond to the time of the start of the pending long tail event, $t_{reference}$=FDTI, and the function h(x) can be defined as follows:

$$h(x) = \begin{cases} 0 & \text{if } x < 0 \\ \max\left(\frac{x * t_{reference}}{g(x + e_{p99.999})}, \frac{(e_{ref} - e_{p99.999}) * t_{reference}}{100.00}\right) & \text{if } 0 < x \le g^{-1}(0.15) - e_{p99.999} \\ \frac{(e_{ref} - e_{p99.999}) * t_{reference}}{0.15} & \text{otherwise} \end{cases} \quad (3)$$

In some examples, the integral R of equation (2) may provide measure of accumulated risk during a long tail event (e.g., pose component error exceeds a threshold value). In some cases, there is no accumulation of risk when the pose component error is less than $e_{p99.999}$, as illustrated by the first condition of equation (3). In some instances, the output of the function g(e) may be equal to the amount of time a constant pose component error may be tolerated before the probability of collision increases beyond an acceptable threshold. For instance, values of e that are approximately equal to $e_{p99.999}$ may result in large values of g(e) as illustrated in FIG. 4. In some aspects, the second condition in equation (3) can be used to provide a minimum risk accumulation rate for values of e that are just above $e_{p99.999}$. In some instances, the third condition in equation (3) can apply a maximum weight for large errors.

In some cases, the limit of R for transitioning to a matured long tail event (e.g., matured long tail event 362) can be equal to the value of R for a reference long tail event (e.g., $e_{reference}$ 408). In some examples, the limit $R_{lim}$, may be calculated using the following equation:

$$R_{lim} = \int_{t_s}^{t_s + t_{reference}} h(e_{reference} - e_{p99.999}) d\tau \quad (4)$$

$$= (e_{reference} - e_{p99.999}) * t_{reference} * \frac{1}{g(e_{reference})} * t_{reference}$$

In some instances, in which $g(e_{reference})=t_{reference}$, equation (4) may yield the following:

$$R_{lim} = (e_{reference} - e_{p99.999}) * t_{reference} \quad (5)$$

In some aspects, the equations disclosed herein can be used to calculate various pose error thresholds for each pose component error (e.g., front pose error 206, rear pose error 208, left pose error 210, and/or right pose error 212). In some examples, the pose error thresholds can include a first pose error threshold associated with an acceptable error (e.g., $e_{p99.999}$ error threshold for detecting a pending long tail event); a second pose error threshold associated with a moderate error (e.g., $e_{reference}$ for transitioning from a pending long tail event to a matured long tail event); and a third pose error threshold associated with a maximum error (e.g., $e_{max}$ for invoking AV safety features). In some cases, an error that is greater than the first pose error threshold (e.g., greater than $e_{p99.999}$ error) may be tolerated for a time period such as time T 308.

In one illustrative example, right pose component error 212 may be associated with a first pose error threshold (e.g., $e_{p99.999}$ error threshold) that is less than or equal to 0.2 meters (m); a second pose error threshold (e.g., $e_{reference}$ for transitioning from a pending long tail event to a matured long tail event) that is less than or equal to 0.4 m; and a third pose error threshold (e.g., $e_{max}$ for invoking AV safety features) that is greater than or equal to 0.5 m. Those skilled in the art will recognize that each of the pose component errors (e.g., front pose error 206, rear pose error 208, left pose error 210, and/or right pose error 212) may be associated with the same or different error thresholds and that the present technology is not limited to any particular pose error threshold values and/or any particular number of pose error thresholds.

As noted above, in some cases, the value of a pose component error may trigger modification of the planned pose (e.g., planned pose 204) of an AV. For example, the planned pose of an AV having a left pose error that exceeds a corresponding pose error threshold may be shifted left in order to reduce the value of the left pose error.

Figure 5A:
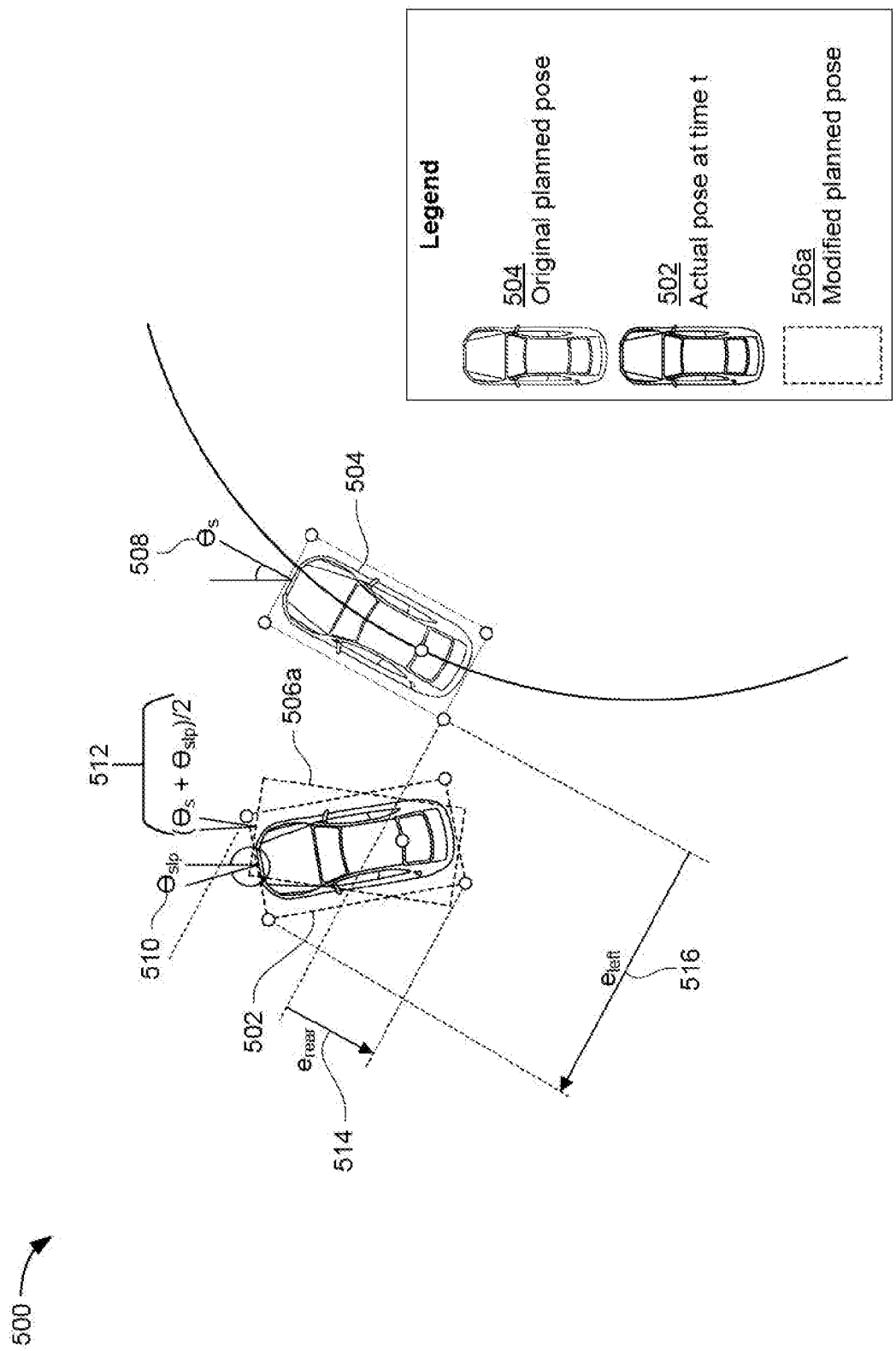
FIG. 5A is a diagram illustrating an example system for modifying the planned pose of an autonomous vehicle.

FIG. 5A is a diagram illustrating an example system 500 for modifying the planned pose of an autonomous vehicle. In some aspects, an AV (e.g., AV 102) may determine one or more pose component errors between actual pose 502 and planned pose 504. In some cases, the pose component errors may include rear pose error 514 and left pose error 516. In some examples, the planned pose 504 of the AV may be modified when the rear pose error 514 and/or the left pose error 516 exceed a pose error threshold.

In some examples, planned pose 504 may first be modified by shifting the position of planned pose 504 to modified planned pose 506a. In some cases, modified planned pose 506a may substantially coincide with the position of actual pose 502. In some instances, modified planned pose 506a may have a modified heading 512. In some aspects, modified heading 512 can be determined based on planned heading 508 (e.g., $\theta_s$ corresponding to planned pose 504) and actual heading 510 (e.g., $\theta_{sip}$ corresponding to actual pose 502). In some examples, modified heading 512 of modified planned pose 506a can be the average of planned heading 508 and actual heading 510.

Figure 5B:
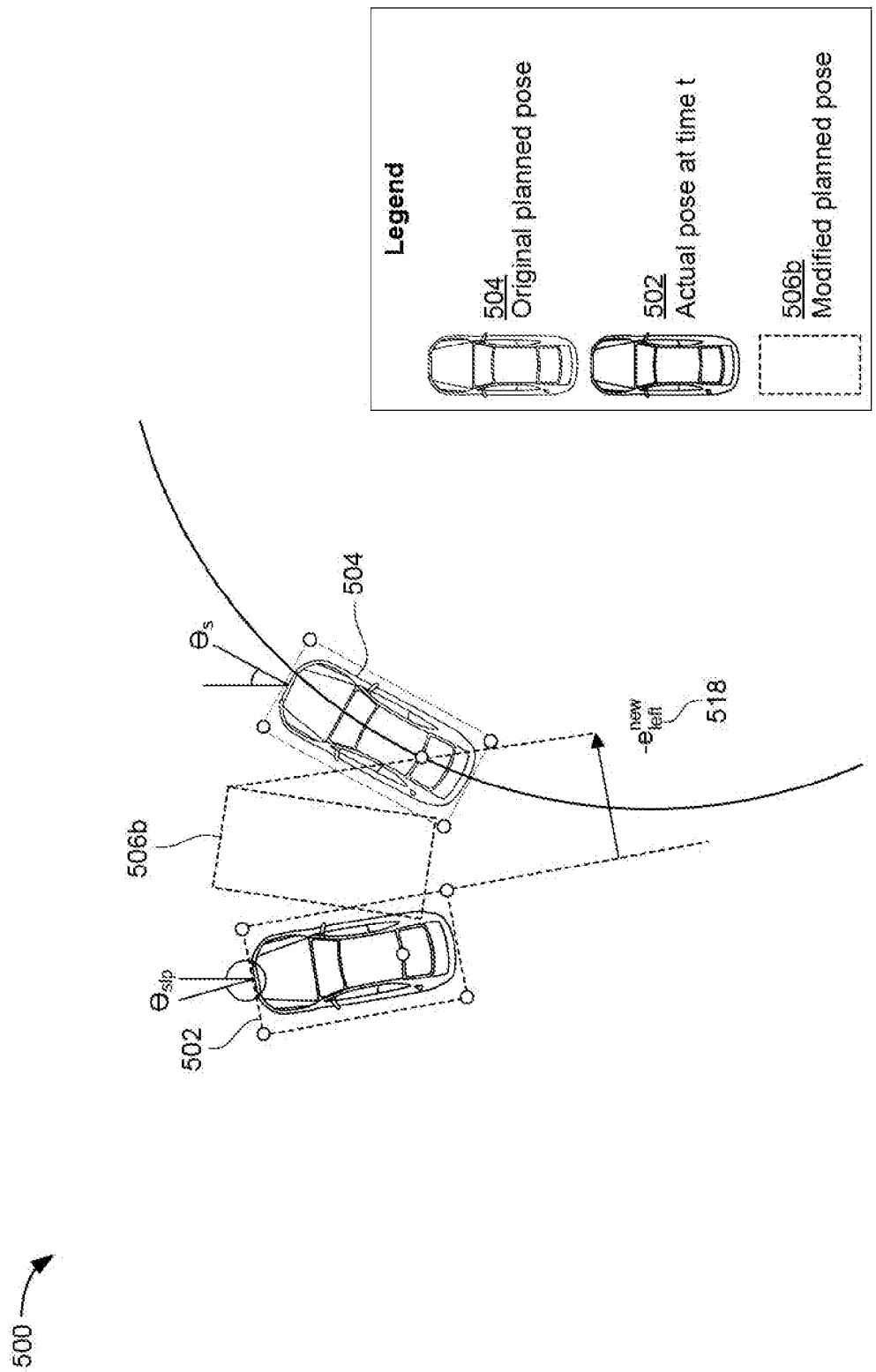
FIG. 5B is a diagram illustrating another example system for modifying the planned pose of an autonomous vehicle.

FIG. 5B is a diagram further illustrating example system 500 for modifying the planned pose of an autonomous vehicle. In some aspects, the modified planned pose 506b can be shifted to a position that reduces a pose component error (e.g., rear pose error 514 and/or left pose error 516). In some cases, the AV may shift modified planned pose 506b to reduce the pose component error having the greatest value. For example, if left pose error 516 is greater than rear pose error 514, the modified planned pose 506b can be positioned to reduce left pose error 516 while maintaining rear pose error 514. In some examples, the position of modified planned pose 506b may reduce left pose error 516 to new left pose error 518. In some aspects, new left pose error 518 can be less than left pose error 516. In some instances, new left pose error 518 can have a non-zero value (e.g., left pose error 516 is not eliminated entirely). In some cases, the AV may shift modified planned pose 506b to reduce and/or eliminate one or more of the pose component errors.

Figure 5C:
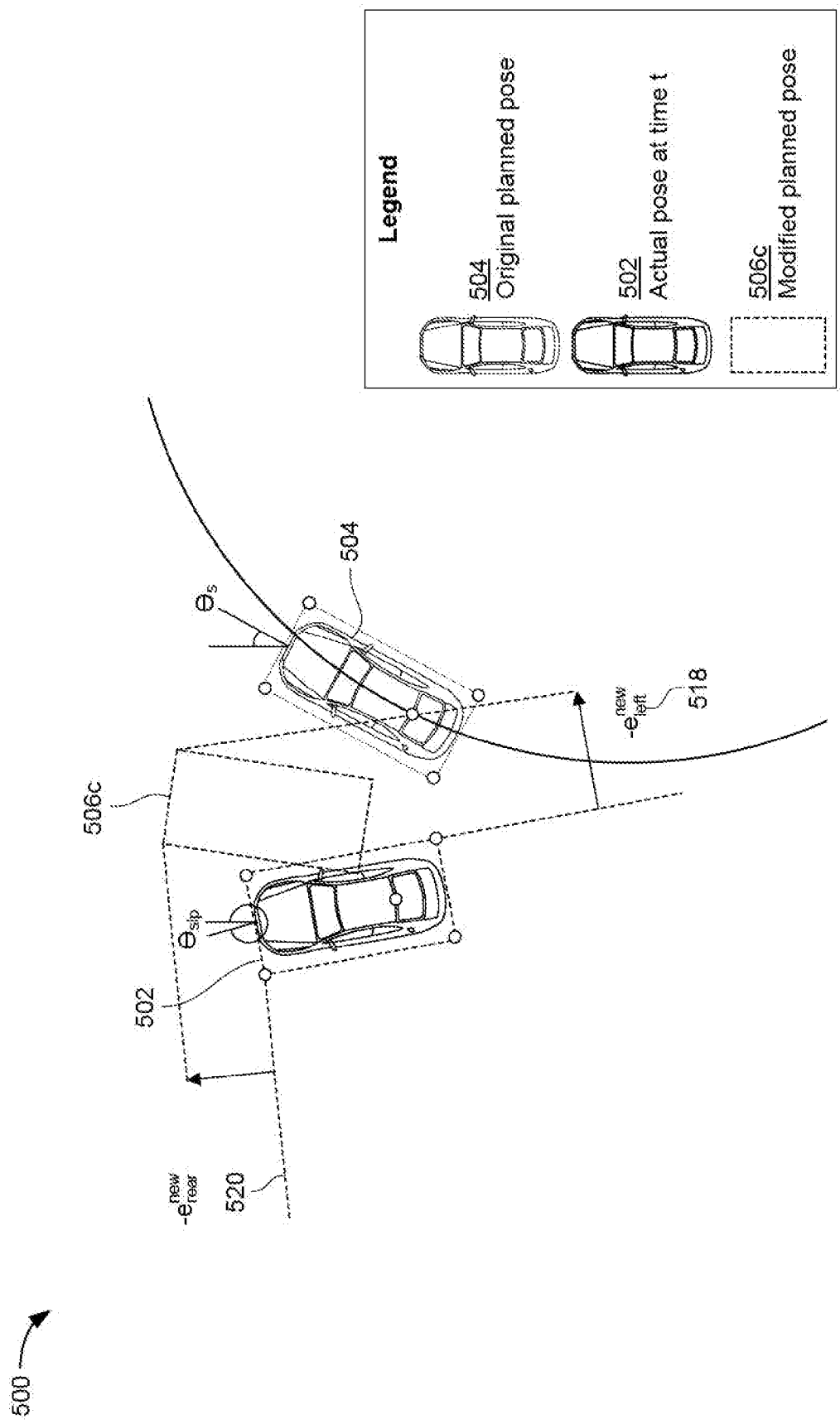
FIG. 5C is a diagram illustrating another example system for modifying the planned pose of an autonomous vehicle.

FIG. 5C is a diagram further illustrating example system 500 for modifying the planned pose of an autonomous vehicle. As noted above, in some examples, modified planned pose 506c may be positioned to reduce a pose component error based on the value of the pose component error relative to a pose component threshold. In some cases, modified planned pose 506c may be positioned such that remaining pose component errors are unchanged. In some cases, limiting the changes in the planned pose (e.g., changes between planned pose 504 and modified planned pose 506c) can improve functionality of the planning stack (e.g., larger changes may cause disruptions in planned path that may affect vehicle maneuvering). As illustrated in FIG. 5C, modified planned pose 506c has been shifted forward to yield new rear pose error 520. In some aspects, new rear pose error 520 can be substantially equal to rear pose error 514.

Figure 6:
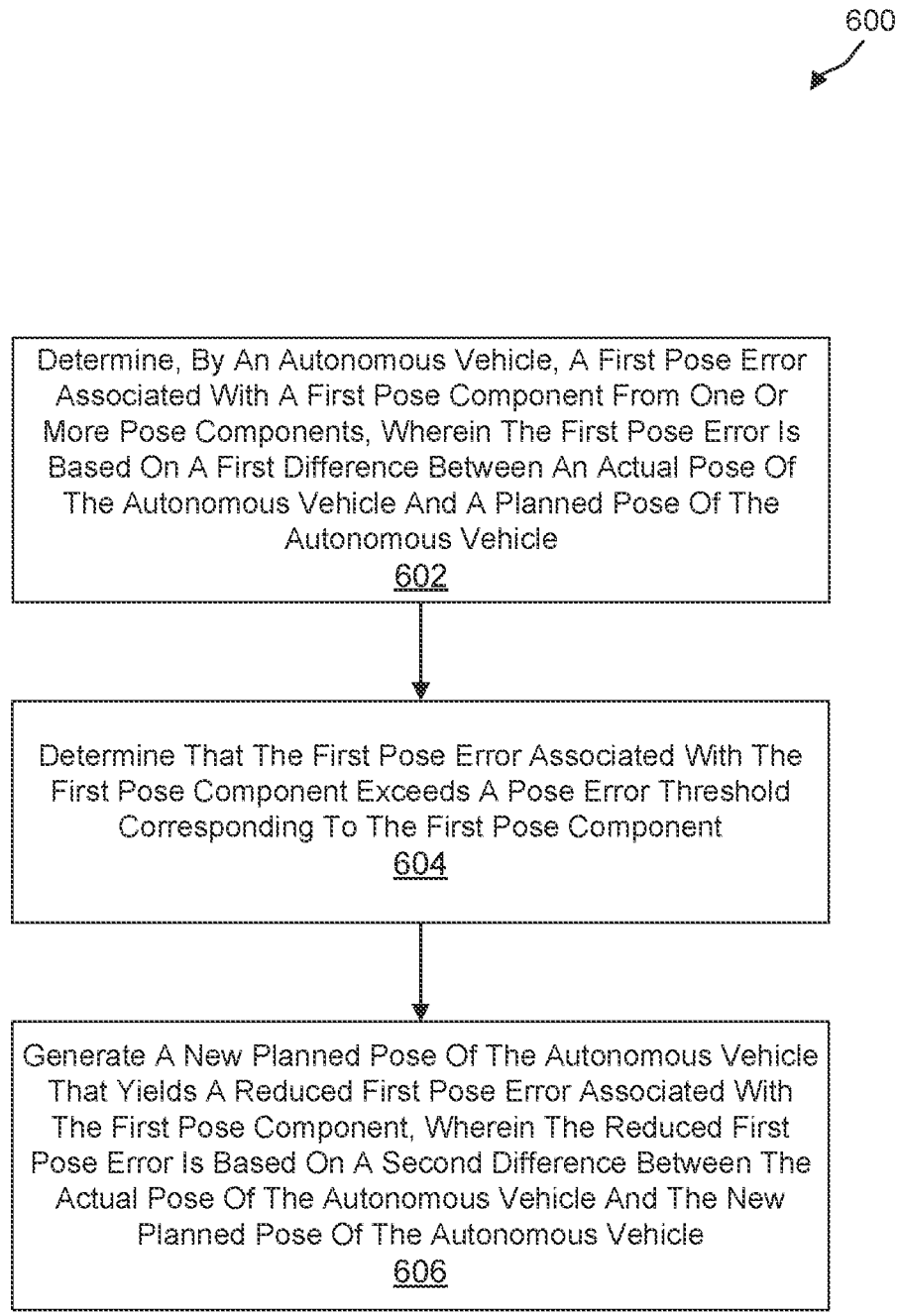
FIG. 6 is a flowchart illustrating an example process for modifying the planned pose of an autonomous vehicle.

FIG. 6 illustrates an example of a process 600 for modifying the planned pose of an autonomous vehicle. At block 602, the process 600 includes determining, by an autonomous vehicle, a first pose error associated with a first pose component from one or more pose components, wherein the first pose error is based on a first difference between an actual pose of the autonomous vehicle and a planned pose of the autonomous vehicle. In some cases, the one or more pose components can include at least one of a left pose component, a right pose component, a forward pose component, and a rear pose component. For example, AV 102 can determine a pose component error (e.g., front pose error 206, rear pose error 208, left pose error 210, and/or right pose error 212) based on a difference between actual pose 202 and planned pose 204.

In some examples, the actual pose of the autonomous vehicle includes an actual position of the autonomous vehicle at a given time and an actual orientation of the autonomous vehicle at the given time. For instance, actual pose 202 can include the actual position of the autonomous vehicle (e.g., AV 102) at time t and the actual orientation of the autonomous vehicle at time t. In some cases, the planned pose of the autonomous vehicle includes a planned position of the autonomous vehicle at a given time and a planned orientation of the autonomous vehicle at the given time. For example, planned pose 204 can include the planned position of the autonomous vehicle at time t and the actual orientation of the autonomous vehicle at time t. In some aspects, the autonomous vehicle may be driving. In some examples, the planned pose of the autonomous vehicle can be based on a planned path of the autonomous vehicle. For instance, AV 102 may determine a discrepancy between a planned pose (e.g., planned pose 204) and an actual pose (e.g., actual pose 202) while driving and/or while stationary. In some cases, AV 102 may determine a discrepancy between a planned pose and an actual pose while travelling along a route that is based on a planned path.

At block 604, the process 600 includes determining that the first pose error associated with the first pose component exceeds a pose error threshold corresponding to the first pose component. For instance, AV 102 can determine that one of the pose component errors (e.g., front pose error 206, rear pose error 208, left pose error 210, and/or right pose error 212) exceeds a corresponding pose error threshold (e.g., pose error threshold $e_{p99.999}$, pose error threshold $e_{reference}$, or pose error threshold $e_{max}$).

At block 606, the process 600 includes generating a new planned pose of the autonomous vehicle that yields a reduced first pose error associated with the first pose component, wherein the reduced first pose error is based on a second difference between the actual pose of the autonomous vehicle and the new planned pose of the autonomous vehicle. For example, modified planned pose 506b can be positioned to yield a new left pose error 518 that is less than left pose error 516.

In some aspects, the pose error threshold can include a first pose error threshold associated with an acceptable error, a second pose error threshold associated with a moderate error, and a third pose error threshold associated with a maximum error. For example, the pose error threshold can include pose error threshold $e_{p99.999}$, pose error threshold $e_{reference}$, or pose error threshold $e_{max}$. In some examples, the process 600 can include determining that the first pose error is greater than or equal to the third pose error threshold and in response, activating a braking system associated with the autonomous vehicle. For example, AV 102 may determine that a right pose error exceeds a maximum pose error threshold and may activate a braking system to avoid a safety critical event (e.g., collision).

In some cases, the process 600 can include determining a revised heading corresponding to the new planned pose of the autonomous vehicle, wherein the revised heading is based on a first heading corresponding to the actual pose of the autonomous vehicle and a second heading corresponding to the planned pose of the autonomous vehicle. For example, modified heading 512 of modified planned pose 506a can be determined based on planned heading 508 (e.g., corresponding to planned pose 504) and actual heading 510 (e.g., corresponding to actual pose 502).

In some aspects, the process 600 can include determining a second pose error associated with a second pose component from the one or more pose components, wherein the second pose error is based on a third difference between the actual pose of an autonomous vehicle and the planned pose of the autonomous vehicle and adjusting the new planned pose of the autonomous vehicle to maintain the second pose error associated with the second pose component. For example, the second pose error can correspond to rear pose error 514 (e.g., based on difference between actual pose 502 and planned pose 504). In some aspects, modified planned pose 506c can be shifted to yield new rear pose error 520 to maintain a rear pose error that is substantially similar to rear pose error 514.

In some examples, the process 600 can include determining a time for tolerating the first pose error based on a difference between the first pose error and the pose error threshold, wherein the new planned pose is generated within the time. For instance, an AV may determine a time T 308 in which the AV may tolerate a pose error. In some aspects, an AV may determine a time T 358 in which it may determine that the magnitude of the pose error will result in a matured long tail event (e.g., error will exceed pose error threshold $e_{reference}$) In some cases, the AV may modify the planned pose within time T 308 and/or time T 358.

In some cases, the process 600 may include detecting activation of one or more vehicle safety features, wherein the first pose error is determined in response to detecting the activation of the one or more vehicle safety features, and wherein the one or more vehicle safety features include at least one of an antilock braking system (ABS), a traction control system (TCS), and an electronic stability control (ESC). For instance, AV 102 may detect activation of a vehicle safety feature. In some cases, detecting activation of a vehicle safety feature may trigger modification of a planned pose of the AV. In some examples, the values of one or more pose error thresholds may be different when a vehicle safety feature is activated. For example, the pose error threshold for triggering modification of a planned pose may be lower when ABS is activated.

Figure 7:
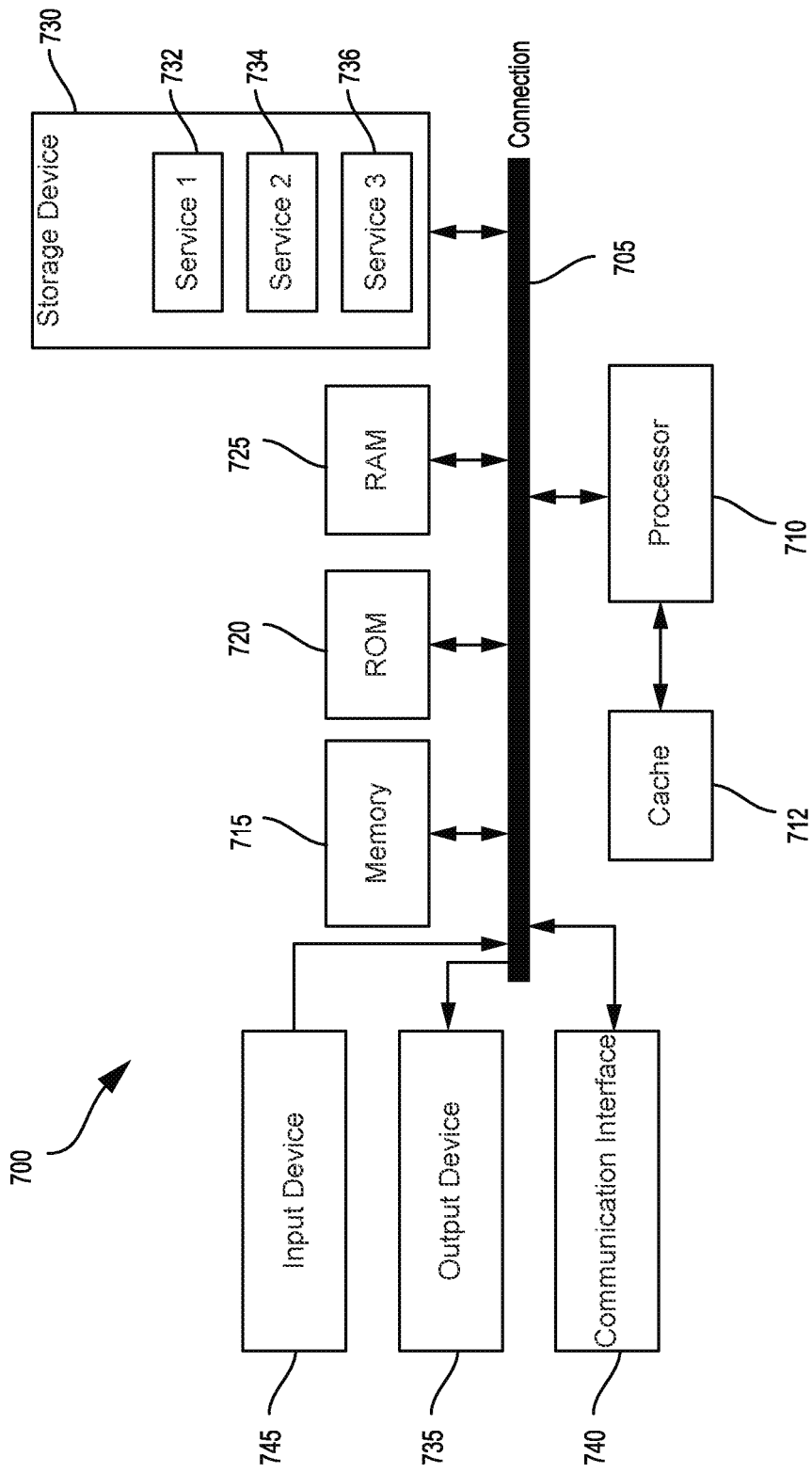
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up internal computing system 110, remote computing system 190, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some cases, one or more of the described system components represents many such components each performing some or all of the function for which the component is described. In some instances, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L#), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples Illustrative examples of the disclosure include:

Aspect 1. A method comprising: determining a first pose error associated with a first pose component from one or more pose components, wherein the first pose error is based on a first difference between an actual pose of an autonomous vehicle and a planned pose of the autonomous vehicle; determining that the first pose error associated with the first pose component exceeds a pose error threshold corresponding to the first pose component; and generating a new planned pose of the autonomous vehicle that yields a reduced first pose error associated with the first pose component, wherein the reduced first pose error is based on a second difference between the actual pose of the autonomous vehicle and the new planned pose of the autonomous vehicle.

Aspect 2. The method of Aspect 1, further comprising: determining a revised heading corresponding to the new planned pose of the autonomous vehicle, wherein the revised heading is based on a first heading corresponding to the actual pose of the autonomous vehicle and a second heading corresponding to the planned pose of the autonomous vehicle.

Aspect 3. The method of any of Aspects 1 to 2, further comprising: determining a second pose error associated with a second pose component from the one or more pose components, wherein the second pose error is based on a third difference between the actual pose of an autonomous vehicle and the planned pose of the autonomous vehicle; and adjusting the new planned pose of the autonomous vehicle to maintain the second pose error associated with the second pose component.

Aspect 4. The method of any of Aspects 1 to 3, wherein the one or more pose components include at least one of a left pose component, a right pose component, a forward pose component, and a rear pose component.

Aspect 5. The method of any of Aspects 1 to 4, further comprising: determining a time for tolerating the first pose error based on a difference between the first pose error and the pose error threshold, wherein the new planned pose is generated within the time.

Aspect 6. The method of any of Aspects 1 to 5, further comprising: detecting activation of one or more vehicle safety features, wherein the first pose error is determined in response to detecting the activation of the one or more vehicle safety features, and wherein the one or more vehicle safety features include at least one of an antilock braking system (ABS), a traction control system (TCS), and an electronic stability control (ESC).

Aspect 7. The method of any of Aspects 1 to 6, wherein the pose error threshold includes a first pose error threshold associated with an acceptable error, a second pose error threshold associated with a moderate error, and a third pose error threshold associated with a maximum error.

Aspect 8. The method of Aspect 7, further comprising: determining that the first pose error is greater than or equal to the third pose error threshold; and in response, activating a braking system associated with the autonomous vehicle.

Aspect 9. The method of any of Aspects 1 to 8, wherein the actual pose of the autonomous vehicle includes an actual position of the autonomous vehicle at a given time and an actual orientation of the autonomous vehicle at the given time.

Aspect 10. The method of any of Aspects 1 to 9, wherein the planned pose of the autonomous vehicle includes a planned position of the autonomous vehicle at a given time and a planned orientation of the autonomous vehicle at the given time.

Aspect 11. The method of any of Aspects 1 to 10, wherein the autonomous vehicle is driving.

Aspect 12. The method of any of Aspects 1 to 11, wherein the planned pose of the autonomous vehicle is based on a planned path of the autonomous vehicle.

Aspect 13: An autonomous vehicle comprising: at least one memory; and at least one processor coupled to the at least one memory, wherein the at least one processor is configured to perform operations in accordance with any one of Aspects 1 to 12.

Aspect 14: An apparatus comprising means for performing operations in accordance with any one of Aspects 1 to 12.

Aspect 15: A non-transitory computer-readable medium comprising instructions that, when executed by an apparatus, cause the apparatus to perform operations in accordance with any one of Aspects 1 to 12.

The various aspects described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   determining, by an autonomous vehicle, a first pose error associated with a first pose component from one or more pose components, wherein the first pose error is based on a first difference between an actual pose of the autonomous vehicle and a planned pose of the autonomous vehicle, wherein the first pose component, the one or more pose components, and the actual pose are determined by a mapping and localization stack of an autonomous vehicle stack of the autonomous vehicle based on sensor inputs from a light detection and ranging (LIDAR) sensor and an inertial measurement unit sensor of the autonomous vehicle and the planned pose is determined by a planning stack of the autonomous vehicle stack of the autonomous vehicle;
   determining by the planning stack of the autonomous vehicle, that the first pose error associated with the first pose component exceeds a pose error threshold corresponding to the first pose component; and generating by the planning stack of the autonomous vehicle, a new planned pose of the autonomous vehicle that yields a reduced first pose error associated with the first pose component, wherein the reduced first pose error is based on a second difference between the actual pose of the autonomous vehicle and the new planned pose of the autonomous vehicle, wherein the actual pose is determined at time t based on data from the one or more pose components and wherein the planned pose is determined before time t based on a planned path of the autonomous vehicle.

2. The method of claim 1, further comprising:
determining a revised heading corresponding to the new planned pose of the autonomous vehicle, wherein the revised heading is based on a first heading corresponding to the actual pose of the autonomous vehicle and a second heading corresponding to the planned pose of the autonomous vehicle.

3. The method of claim 1, further comprising:
determining a second pose error associated with a second pose component from the one or more pose components, wherein the second pose error is based on a third difference between the actual pose of an autonomous vehicle and the planned pose of the autonomous vehicle; and
adjusting the new planned pose of the autonomous vehicle to maintain the second pose error associated with the second pose component.

4. The method of claim 1, wherein the one or more pose components include at least one of a left pose component, a right pose component, a forward pose component, and a rear pose component.

5. The method of claim 1, further comprising:
determining a time for tolerating the first pose error based on a difference between the first pose error and the pose error threshold, wherein the new planned pose is generated within the time.

6. The method of claim 1, further comprising:
detecting activation of one or more vehicle safety features, wherein the first pose error is determined in response to detecting the activation of the one or more vehicle safety features, and wherein the one or more vehicle safety features include at least one of an antilock braking system (ABS), a traction control system (TCS), and an electronic stability control (ESC).

7. The method of claim 1, wherein the pose error threshold includes a first pose error threshold associated with an acceptable error, a second pose error threshold associated with a moderate error, and a third pose error threshold associated with a maximum error.

8. The method of claim 7, further comprising:
determining that the first pose error is greater than or equal to the third pose error threshold; and
in response, activating a braking system associated with the autonomous vehicle.

9. The method of claim 1, wherein the actual pose of the autonomous vehicle includes an actual position of the autonomous vehicle at a given time and an actual orientation of the autonomous vehicle at the given time, and wherein the planned pose of the autonomous vehicle includes a planned position of the autonomous vehicle at the given time and a planned orientation of the autonomous vehicle at the given time.

10. The method of claim 1, wherein the autonomous vehicle is driving based on a planned path, and wherein the planned pose is based on the planned path.

11. An apparatus comprising:
at least one memory comprising instructions; and
at least one processor configured to execute the instructions and cause the apparatus to:
determine a first pose error associated with a first pose component from one or more pose components, wherein the first pose error is based on a first difference between an actual pose of an autonomous vehicle and a planned pose of the autonomous vehicle, wherein the first pose component, the one or more pose components, and the actual pose are determined by a mapping and localization stack of an autonomous vehicle stack of the autonomous vehicle based on sensor inputs from a light detection and ranging (LIDAR) sensor and an inertial measurement unit sensor of the autonomous vehicle and the planned pose is determined by a planning stack of the autonomous vehicle stack of the autonomous vehicle;
determine, by the planning stack of the autonomous vehicle, that the first pose error associated with the first pose component exceeds a pose error threshold corresponding to the first pose component; and
generate, by the planning stack of the autonomous vehicle, a new planned pose of the autonomous vehicle that yields a reduced first pose error associated with the first pose component, wherein the reduced first pose error is based on a second difference between the actual pose of the autonomous vehicle and the new planned pose of the autonomous vehicle,
wherein the actual pose is determined at time t based on data from the one or more pose components and wherein the planned pose is determined before time t based on a planned path of the autonomous vehicle.

12. The apparatus of claim 11, wherein the at least one processor is further configured to cause the apparatus to:
determine a revised heading corresponding to the new planned pose of the autonomous vehicle, wherein the revised heading is based on a first heading corresponding to the actual pose of the autonomous vehicle and a second heading corresponding to the planned pose of the autonomous vehicle.

13. The apparatus of claim 11, wherein the at least one processor is further configured to cause the apparatus to:
determine a second pose error associated with a second pose component from the one or more pose components, wherein the second pose error is based on a third difference between the actual pose of an autonomous vehicle and the planned pose of the autonomous vehicle; and
adjust the new planned pose of the autonomous vehicle to maintain the second pose error associated with the second pose component.

14. The apparatus of claim 11, wherein the one or more pose components include at least one of a left pose component, a right pose component, a forward pose component, and a rear pose component.

15. The apparatus of claim 11, wherein the at least one processor is further configured to cause the apparatus to:
determine a time for tolerating the first pose error based on a difference between the first pose error and the pose error threshold, wherein the new planned pose is generated within the time.

16. The apparatus of claim 11, wherein the at least one processor is further configured to cause the apparatus to:
detect activation of one or more vehicle safety features, wherein the first pose error is determined in response to detecting the activation of the one or more vehicle safety features, and wherein the one or more vehicle safety features include at least one of an antilock braking system (ABS), a traction control system (TCS), and an electronic stability control (ESC).

17. The apparatus of claim 11, wherein the at least one processor is further configured to cause the apparatus to:
   determine that the first pose error is greater than or equal to a maximum pose error threshold; and
   in response, activate a braking system associated with the autonomous vehicle.

18. A non-transitory computer-readable storage medium having stored thereon instructions which, when executed by one or more processors, cause the one or more processors to:
   determine a first pose error associated with a first pose component from one or more pose components, wherein the first pose error is based on a first difference between an actual pose of an autonomous vehicle and a planned pose of the autonomous vehicle, wherein the first pose component, the one or more pose components, and the actual pose are determined by a mapping and localization stack of an autonomous vehicle stack of the autonomous vehicle based on sensor inputs from a light detection and ranging (LIDAR) sensor and an inertial measurement unit sensor of the autonomous vehicle and the planned pose is determined by a planning stack of the autonomous vehicle stack of the autonomous vehicle;
   determine, by the planning stack of the autonomous vehicle, that the first pose error associated with the first pose component exceeds a pose error threshold corresponding to the first pose component; and
   generate, by the planning stack of the autonomous vehicle, a new planned pose of the autonomous vehicle that yields a reduced first pose error associated with the first pose component, wherein the reduced first pose error is based on a second difference between the actual pose of the autonomous vehicle and the new planned pose of the autonomous vehicle,
   wherein the actual pose is determined at time t based on data from the one or more pose components and wherein the planned pose is determined before time t based on a planned path of the autonomous vehicle.

19. The non-transitory computer-readable storage medium of claim 18, comprising further instructions which, when executed by the one or more processors, cause the one or more processors to:
   determine a revised heading corresponding to the new planned pose of the autonomous vehicle, wherein the revised heading is based on a first heading corresponding to the actual pose of the autonomous vehicle and a second heading corresponding to the planned pose of the autonomous vehicle.

20. The non-transitory computer-readable storage medium of claim 18, comprising further instructions which, when executed by the one or more processors, cause the one or more processors to:
   determine a time for tolerating the first pose error based on a difference between the first pose error and the pose error threshold, wherein the new planned pose is generated within the time.

* * * * *